United States Patent
Namiranian

(10) Patent No.: US 10,477,384 B2
(45) Date of Patent: Nov. 12, 2019

(54) ESIM PROFILE STATE CHANGE

(71) Applicant: T-Mobile USA, Inc., Bellevue, WA (US)

(72) Inventor: Babak Namiranian, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/033,116

(22) Filed: Jul. 11, 2018

(65) Prior Publication Data

US 2019/0268755 A1    Aug. 29, 2019

Related U.S. Application Data

(60) Provisional application No. 62/636,756, filed on Feb. 28, 2018.

(51) Int. Cl.
| | | |
|---|---|---|
| H04W 8/18 | (2009.01) | |
| H04W 8/20 | (2009.01) | |
| H04L 29/06 | (2006.01) | |
| H04W 4/50 | (2018.01) | |
| H04W 4/70 | (2018.01) | |

(52) U.S. Cl.
CPC ......... *H04W 8/183* (2013.01); *H04L 63/0853* (2013.01); *H04L 63/102* (2013.01); *H04W 4/50* (2018.02); *H04W 8/205* (2013.01); *H04W 4/70* (2018.02)

(58) Field of Classification Search
CPC ....... H04W 4/50; H04W 8/183; H04W 8/205; H04L 63/102
See application file for complete search history.

(56) References Cited

U.S. PATENT DOCUMENTS

| | | | | |
|---|---|---|---|---|
| 9,253,244 | B1 * | 2/2016 | Heitmann | ............... H04L 67/02 |
| 2015/0281964 | A1 * | 10/2015 | Seo | ....................... H04L 63/102 |
| | | | | 726/9 |
| 2015/0347786 | A1 * | 12/2015 | Yang | ..................... H04W 8/183 |
| | | | | 726/26 |
| 2017/0289788 | A1 | 10/2017 | Lalwaney | |
| 2017/0318465 | A1 | 11/2017 | Seo et al. | |

(Continued)

FOREIGN PATENT DOCUMENTS

WO    2017220155 A1    12/2017

OTHER PUBLICATIONS

International Application No. PCT/US2019/019908, International Search Report and Written Opinion dated Mar. 12, 2019, 9 pages.

*Primary Examiner* — Said M Elnoubi
(74) *Attorney, Agent, or Firm* — Han Santos, PLLC

(57) ABSTRACT

The techniques provide a wireless communication carrier with the ability to directly initiate a subscription management service to perform profile state changes with respect to eSIM profile states that are maintained by the subscription management service. A profile transition request is received from an entity at an eSIM management platform. The profile transition request includes a profile state change for an eSIM profile from a first profile state to a second profile state. The requested profile state change is validated using a validation table of permissible profile state changes that is common to the eSIM management platform and the subscription management service. The profile transition request is sent to the subscription management service in response to the validation of the profile state change.

20 Claims, 8 Drawing Sheets

(56) References Cited

U.S. PATENT DOCUMENTS

| | | |
|---|---|---|
| 2018/0004736 A1 | 1/2018 | Zhao et al. |
| 2018/0027407 A1 | 1/2018 | Veneroso |
| 2018/0242141 A1* | 8/2018 | Wu .................. H04W 8/20 |
| 2019/0007082 A1* | 1/2019 | Dumoulin ............. H04W 8/183 |

* cited by examiner

ESIM PROFILE STATE CHANGE

CROSS REFERENCE TO RELATED PATENT APPLICATION

This application claims priority to U.S. Provisional Patent Application No. 62/636,756, filed on Feb. 28, 2018, entitled "Profile Status Change," which is hereby incorporated by reference in its entirety.

BACKGROUND

The use of Embedded Universal Integrated Circuit Cards (eUICCs), also referred to as Embedded Subscriber Identity Modules (eSIMs), is becoming increasingly prevalent in consumer and machine-to-machine (M2M) communication fields. Unlike a traditional UICC or SIM card that exists as a removable smart card that is transferrable between multiple devices, an eUICC is an integrated circuit that is not designed to be user removable, i.e., it is generally embedded with or soldered to other electronic components of a device.

An eUICC may be provisioned with one or more eSIM profiles, in which each eSIM profile contains a unique international mobile subscriber identity (IMSI) number that authenticates a subscriber to a wireless communication carrier. Other data that are stored in the eSIM profile may include carrier network information, security authentication information, a list of accessible network services, and/or so forth. The wireless communication carrier may use a subscription management service to transfer an eSIM profile to the eUICC of a user device via a consumer device or a M2M device via an over-the-air (OTA) update. Consumer devices are network-capable devices that are generally marketed to individual consumers. For example, these devices may include a smartphone, a tablet computer, a smartwatch, a gaming console, and/or so forth. M2M devices are networked machines that use the telecommunication services provided by the wireless communication carrier to communicate with other networked machines. For example, a M2M monitoring device that is embedded on a vehicle may automatically send vehicle tracking and operation information to a remote support device at a control center. In another example, a M2M device in the form of a smart home appliance may automatically send diagnostic information to a monitoring device at a service center in case of device malfunction.

Additionally, the subscription management service may store a profile state for each eSIM profile in a profile state database maintained by the subscription management service. The profile states of the eSIM profiles are used by the wireless communication carrier to assign eSIM profiles to user devices, as well as control access of the user devices to the telecommunication services provided by the wireless communication carrier. For example, a profile state of "available" indicates that an eSIM profile is available for allocation by the subscription management service to a user device, while a profile state of "unavailable" indicates that the eSIM profile is not available for allocation to a user device by the subscription management service. The wireless communication carrier may occasionally prompt the subscription management service to update the profile states of the eSIM profiles that are stored in the profile state database of the subscription management service. For example, a profile state update of a profile state may be performed to prepare a corresponding eSIM profile for use by a user device. In another example, the profile state update may be performed to correct a profile state error caused by an initial incorrect profile state database entry or a previously failed profile state update. A profile state error may render a user device that is provisioned with the corresponding eSIM profile unable to use the telecommunication services of the wireless communication carrier.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
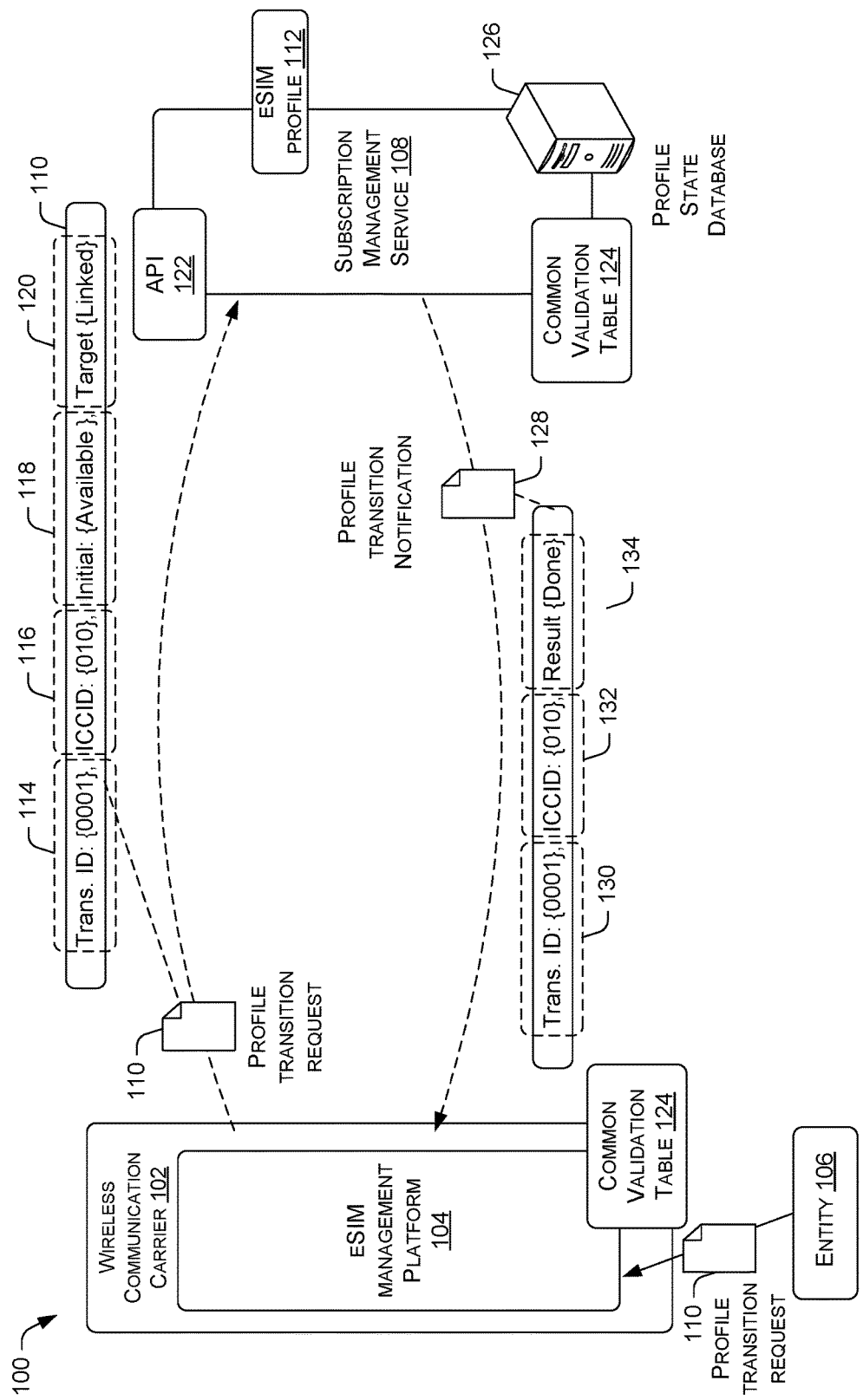
FIG. 1 illustrates an example architecture that enables an Embedded Subscriber Identity Module (eSIM) management platform to initiate a subscription management service to update individual profile states of eSIM profiles.

This disclosure is directed to techniques that enable an Embedded Subscriber Identity Module (eSIM) management platform to initiate a subscription management service to perform an individual update of a profile state of an eSIM profile, or perform a batch update of multiple profile states of eSIM profiles. The eSIM management platform may initiate such updates in response to requests from an entity. The entity may be a wireless communication carrier, also referred to as a mobile network operator (MNO), or a third-party partner of the wireless communication carrier, such as a M2M device vendor, a M2M device operator, and/or so forth. However, in other instances, an entity may be a network aggregator or a hub. A network aggregator or a hub is a telecommunication service provider that consolidates carrier services provided by multiple wireless communication carriers into a single carrier service for offering to subscribers.

The eSIM management platform is a backend service of a wireless communication carrier that serves as a central interface between various entities and subscription management services. The eSIM management platform enables the entities to manage the deployment of eSIM profiles into eUICCs of user devices. For example, the eSIM management platform may receive a request from an entity to perform a profile management task, such as provisioning an eUICC of a user device with an eSIM profile, activating an eSIM profile that is stored in the eUICC for use, or deleting an eSIM profile from the eUICC. In turn, the eSIM management platform may relay the request to a subscription management service that is responsible for managing the affected eSIM profile. Thus, the subscription management service may be used by an entity to perform eSIM profile management. In various embodiments, the subscription management service is responsible for managing eSIM profiles provisioned to the eUICCs of machine-to-machine (M2M) devices and consumer devices that receive telecommunication services from the entity. Accordingly, the profile states of the eSIM profiles are stored in a profile state database of the subscription management service.

In various embodiments, the eSIM management platform may receive a profile transition request from an entity. The profile transition request may ask for a profile state change for a single eSIM profile, or for a batch of profile state changes to multiple eSIM profiles. In turn, the eSIM management platform may use a validation table to validate each profile state change in the profile transition request to ensure that each requested profile state change is a permissible operation. Such validation may prevent the intentional or accidental cloning of an eSIM profile via a profile state change. Assuming that each requested profile state change in the profile transition request is validated, the eSIM management platform may send the profile transition request to the subscription management service. In some embodiments, the eSIM management platform may send a profile transition request to the subscription management service by calling an application program interface (API) of the subscription management service. In other embodiments, an eSIM management platform may use a file transfer mechanism provided by the subscription management service to transfer a profile transition request as a data file to the subscription management service. For example, the data file may be a comma separated value (CSV) file, an Extensible Markup Language (XML) file, etc.

In turn, the subscription management service may perform the one or more profile state changes included in the profile transition request. For example, a current profile state of an eSIM profile that is stored in the profile state database of the subscription management service may be changed by the service to the target profile state specified in the profile transition request. Such profile state changes may be repeated for one or more stored profile states of eSIM profiles until every profile state change in the profile transition request is processed. In some embodiments, the subscription management service may be configured to perform multiple validations prior to performing the actual profile state change for an eSIM profile. For instance, a profile state change requested in a profile transition request may provide an initial profile state for an eSIM profile and also designate a target profile state for the eSIM profile. The subscription management service may verify that the initial profile state provided by the profile transition request matches a current profile state for the eSIM profile as stored in a profile state database of the subscription management service. In the event that the initial profile state does not match the current profile state, the subscription management service may refuse to implement the profile state change.

In other instances, the subscription management service may use a duplicate copy of the validation table from the eSIM management platform to validate whether the profile state change requested in the profile transition request is a permissible or disallowed operation. Thus, the subscription management service may once again refuse to implement the profile state change when the profile state change is a prohibited operation. Such validation may prevent the intentional or accidental cloning of an eSIM profile via a profile state change.

Following the processing of a profile transition request, the subscription management service may provide a profile state change notification to the eSIM management platform. The profile state change notification may indicate the success or failure of each profile state change requested in the profile transition request. In instances in which a particular profile state change has failed, the notification may further include a reason for the failure of the profile state change. For example, the notification may indicate that the failure was due to an initial state specified in a profile transition request not matching a current state of the eSIM profile as stored in a profile state database. In another example, the notification may indicate that the failure was due to the profile transition request specifying a prohibited profile state change operation.

The embodiments may provide a wireless communication carrier with the ability to directly initiate a subscription management service to perform profile state changes with respect to eSIM profile states that are maintained by the subscription management service. This ability may enable the wireless communication carrier to quickly fix subscriber telecommunication service outages due to incorrect eSIM profile states without resorting to opening trouble tickets with a help desk of the subscription management service. Such trouble tickets may sit in a queue with trouble tickets for other problems awaiting resolution by the help desk of the subscription management service, which may cause unwanted delay. Accordingly, the ability to directly initiate a subscription management service to perform profile state changes may significantly reduce problem resolution time and increase subscriber satisfaction with the wireless communication carrier. The techniques described herein may be implemented in a number of ways. Example implementations are provided below with reference to the following FIGS. 1-8.

Example Architecture

FIG. 1 illustrates an example architecture 100 that enables an eSIM management platform to initiate a subscription management service to update individual profile states of eSIM profiles. The wireless communication carrier 102 may provide a wide range of mobile communication services, as well as ancillary services and features, to subscribers and associated mobile device users. The wireless communication carrier 102 may also be referred to as a mobile network operator (MNO). In various embodiments, the wireless communication carrier 102 may provide wireless communication between multiple user devices. Further, the wireless communication carrier 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless communication carrier 102 may be implemented using multiple interconnected networks. In various embodiments, the wireless communication carrier 102 may include multiple Radio Access Networks (RANs). The RANs may be connected to each other via regional ground networks. In turn, the regional ground networks may be connected to a core network by a wide area network (WAN). Each regional portion of the wireless communication carrier 102 may include one or more RANs and a regional circuit and/or packet switched network and associated signaling network facilities. The wireless communication carrier 102 may provide telecommunication services in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), 5th Generation (5G), and/or so forth. In some embodiments, the core network of the wireless communication carrier 102 may be accessed via wired or wireless local area networks (LANs). For example, a wireless local area network may be a network that is established using Wi-Fi or Bluetooth standards and hardware.

A RAN of the wireless communication carrier 102 may include a number of base stations, also referred as network cells. In some embodiments, the base stations may be in the form of nodes. Each node may include a base transceiver system (BTS) that communicates via an antennae system over an air-link with one or more user devices that are within range. The BTS may send radio communication signals to user devices and receive radio communication signals from user devices. The RANs may carry the communications of the user devices between the respective base stations and a core network of the wireless communication carrier 102. The core network may connect to a public packet data communication network, such as the Internet. Data and voice communications via the RANs, the core network, and the Internet may support a variety of telecommunication services through the wireless communication carrier 102.

In various embodiments, 2G and/or 3G network components of the wireless communication carrier 102 may include a serving GPRS support node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) gateway (PGW) that routes data traffic between the GGSN and the Internet. The LTE components of the wireless communication carrier 102 may include an Evolved Packet Core (EPC) and an IP multimedia Subsystem (IMS) core.

The wireless communication carrier 102 may provide telecommunication services to multiple user devices, which may include consumer devices and M2M devices. Consumer devices are network-capable device that are generally marketed to individual consumers, and are capable of obtain telecommunication and/or data communication services from the wireless communication carrier 102. For example, these devices may include a smartphone, a tablet computer, a smartwatch, a gaming console. M2M devices are networked machines that use the telecommunication services provided by the wireless carrier to communicate with other devices. Each of the user devices may be equipped with an eUICC, i.e., an integrated circuit chip that is directly wired or soldered to a circuit board of the user device. The eUICC may store one or more eSIM profiles, in which an eSIM profile may include information for accessing telecommunication services provided by a corresponding wireless communication carrier, such as the wireless communication carrier 102. Each user device may be further equipped with a modem that enables the user device to perform telecommunication and data communication with the wireless communication carrier 102. Accordingly, the modem may encode digital information for transmission in uplink radio signals to the wireless communication carrier 102, as well as decode digital information that are received from the wireless communication carrier 102 via downlink radio signals.

The backend servers of the wireless communication carrier 102 may provide an eSIM management platform 104. The eSIM management platform 104 may serve as a central interface between entities, such as the entity 106, and a subscription management service 108. The entities may be a third-party partner of the wireless communication carrier, a M2M device vendor, a M2M device operator, and/or so forth. A third-party partner of the wireless communication carrier 102 may be a provider that provides content or services to the subscribers of the carrier. However, in other instances, an entity may be a network aggregator or a hub. A network aggregator or a hub is a telecommunication service provider that consolidates carrier services provided by multiple wireless communication carriers into a single carrier service for offering to subscribers. In some instances, the wireless communication carrier 102 itself may also be an entity.

In its role as the central interface, the eSIM management platform 104 may receive eSIM profile management requests from multiple entities. Such requests may include a request from an entity to provision an eUICC of a user device with an eSIM profile, delete an eSIM profile from the eUICC of the user device, activate an eSIM profile that is stored in the eUICC of the user device to obtain communication services from a wireless communication carrier. In turn, the eSIM management platform 104 may relay the request to a subscription management service, such as the subscription management service 108, for the completion of the request.

The subscription management service 108 is responsible for the management of one or more sets of eSIM profiles that are provisioned to eUICCs of user devices. A set of eSIM profiles managed by the subscription management service 108 may belong to one or more entities. Each of the subscription management services 108(1)-108(N) may be provided by one or more subscriber managers. In some embodiments, the subscription management service 108 may be provided by multiple subscription manager applications, such as at least one Subscription Manager Data Preparation (SM-DP), at least one Subscription Manager Data Preparation Plus (SM-DP+), and at least one Subscription Manager Secure Routing (SM-SR). The eSIM profiles for M2M devices, also referred to as M2M eSIM profiles, may be loaded into the profile data stores of SM-DPs that implement the subscription management service 108. On the other hand, the eSIM profiles for consumer devices, also referred to as consumer eSIM profiles, may be loaded into profile state stores of a SM-DP+ that implement the subscription management service 108. The subscription management service 108 may further maintain a profile database that tracks the profile states of eSIM profiles, in which the profile state of each eSIM profile may be determined by the deployment and/or usage status of the eSIM profile. Table I below illustrates some example eSIM profile states and their accompanying descriptions.

TABLE I

Example eSIM Profile States and Descriptions

| State Name | Description |
| --- | --- |
| Available | The eSIM profile is available in the inventory of the SM-DP+. |
| Allocated | The eSIM profile is reserved for downloading without being linked to an eUICC ID (EID). |
| Linked | The eSIM profile is reserved for downloading and is linked to an EID. |
| Confirmed | The eSIM profile is reserved for downloading (linked or not linked to an EID) with matching ID and confirmation code if required. |
| Released | The eSIM profile is ready for download and installation after network configuration by the NVO (e.g., HLR Registration). |
| Downloaded | The bound eSIM profile was delivered to the Local Profile Assistant (LPA) on a user device. |
| Installed | The eSIM profile was successfully installed on the eUICC. |
| Error | The eSIM profile has not been installed because of one of the following error cases: confirmation code retry limit exceeded download retry limit exceeded end user rejection error during download and installation |
| Unavailable | The eSIM profile cannot be reused by the SM-DP+. |

The eSIM management platform 104 may include an application program interface (API) abstraction layer that provides multiple APIs to the various entities, in which the entities may call the APIs to initiate profile management tasks for the eSIM profiles.

In one operation scenario, the entity 106 may call an API of the eSIM management platform 104 to send a profile transition request 110 to the eSIM management platform 104. The profile transition request 110 may be requesting a profile state change for a single eSIM profile, such as the eSIM profile 112. Depending on whether the eSIM profile 112 has been deployed, the eSIM profile 112 may be stored in a profile store of the subscription management service 108, or provisioned in an eUICC of a user device. In turn, the eSIM management platform 104 may send the profile transition request 110 to the subscription management service 108. The profile transition request 110 may include a dataset that contains multiple fields. The fields may include a transaction identifier 114, an integrated Circuit Card ID (ICCID) 116, an initial state field 118, and a target state field 120. The transaction identifier 114 may be a uniquely assigned identifier that identifies the profile transition request 110. The ICCID 116 identifies the eSIM profile 112 for which the profile state change is requested, and the initial state field 118 indicates an eSIM profile state that the requesting entity has as the up-to-date profile state of the eSIM profile. The target state field 120 indicates an end profile state to which the eSIM profile 112 is to transition. In various embodiments, the eSIM management platform 104 may call an API 122 of the subscription management service 108 to transfer the profile transition request 110 to the service. In some instances, the API 122 may be a new API that is specifically implemented on the subscription management service 108 to receive profile transition requests from the eSIM management platform 104. In other instances, the API 122 may be a modified version of an existing API of the subscription management service 108 that conforms to GSM (Global System for Mobile Communications) Association, or GSMA ES2/ES2+ interface standards. For example, the API may be a Representational State Transfer (REST) API that transfers the profile transition request 110 as JavaScript Object Notation (JSON) data.

In some embodiments, the eSIM management platform 104 may perform a validation of the profile state change in the profile transition request 110 to ensure that the profile state change is a permissible operation. For example, accidentally or intentionally changing the profile state of an eSIM profile that is already installed and enabled on an eUICC of a user device to a profile state of "available" means that the same eSIM profile can then be downloaded to the eUICC of a different user device. This results in a cloning of the eSIM profile because the eSIM profile is now assigned to two different user devices. In another example, an eSIM profile may be installed and enabled on an eUICC of a user device. Subsequently, an entity may request that the profile state of the eSIM profile be changed to "error". At a later time, the profile state of the eSIM profile is inadvertently changed from "error" to "available" under the direction of the entity and assigned to another eUICC. Once again, this results in an accidental cloning of the eSIM profile due to the assignment of the eSIM profile to two different eUICCs.

Accordingly, the eSIM management platform may use a validation table, such as a common validation table 124, to ensure that a particular initial profile state of an eSIM can only be changed to a specific target profile state that belongs to a group of one or more permissible target states. As further described below, the validation table may be referred to as a common validation table because a duplicate copy of the validation table is shared with the subscription management service 108. In this way, the subscription management service 108 may perform a similar validation for a received profile state change prior to implementing the change. Table II illustrates an example of a common validation table 124 that is shared between the eSIM management platform 104 and the subscription management service 108 for performing such validation.

TABLE II

Examples of Permissible Profile State Changes for an eSIM

| Initial State | Permissible Target State |
| --- | --- |
| Available | Allocated or Linked |
| Allocated | Confirmed Released, or Available |
| Linked | Confirmed, Released, or Available |
| Confirmed | Released, or Available |
| Released | Available |
| Downloaded | Installed |
| Error | Unavailable |
| Installed | Unavailable |

Thus, the eSIM management platform 104 may extract the initial profile state and the target profile state from the profile transition request 110. Subsequently, the eSIM management platform 104 may use the validation table to determine whether the profile state change between the initial profile state and the target profile state is permissible. If the profile state change is permissible, the eSIM management platform 104 may send the profile transition request 110 to the subscription management service 108. However, if the profile state change is disallowed, the eSIM management platform 104 may send a notification to the requesting entity indicating that the profile transition request 110 is not permitted.

Following receipt of the profile transition request 110, the subscription management service 108 may perform its own checks of the profile state change requested in the profile transition request 110. In some instances, the subscription management service 108 may obtain an initial profile state of the eSIM profile 112 from the initial state field 118 of the profile transition request 110. The initial profile state of the eSIM profile 112 is then compared a current profile state of the eSIM profile 112 as stored in a profile state database 126 of the subscription management service. Since the subscription management service 108 is responsible for managing eSIM profiles, the current state of the eSIM profile 112 is the accurate state. A discrepancy between the initial profile state and the current profile state of the eSIM profile 112 may occur due to failed communication or a lack of timely communication between the subscription management service 108 and the eSIM management platform 104. For example, the subscription management service may have previously updated a profile state of the eSIM profile 112. However, the completion of such a profile state update may not have been timely communicated to the requesting entity prior to the requesting entity issuing the profile transition request 110.

Thus, if there is a mismatch between the initial profile state and the current profile state for the eSIM profile 112, the subscription management service 108 may refuse to perform the profile state change specified in the profile transition request 110. Instead, the subscription management service 108 may notify the eSIM management platform 104 of the error.

An additional check that the subscription management service 108 may perform is a validation that the profile state change requested in the profile transition request 110 is a permissible operation. This validation is performed in the same manner as by the eSIM management platform 104, but is performed using a duplicate copy of the validation table used by the platform, such as the common validation table 124. Accordingly, if the subscription management service 108 determines that the profile state change specified in the profile transition request 110 is a disallowed operation, the subscription management service 108 may refuse to perform the profile state change. Instead, the subscription management service 108 may notify the eSIM management platform 104 of the error. However, assuming that the subscription management service 108 has validated the profile transition request 110, the service may change a profile state of the eSIM profile 112 as stored in the profile state database 126 from the current profile state to the target profile state specified in the profile transition request 110.

The subscription management service 108 may send a profile transition notification 128 to the eSIM management platform 104 following a processing of the profile transition request 110 for the eSIM profile 112. The profile transition notification 128 may be a dataset that includes a transaction identifier 130 that matches the transaction identifier 114, an ICCID 132 that matches the ICCID 116, and a result field 134. In the event that the profile state change was successful, the result field 134 may indicate that the profile state change is complete. However, if the profile state change failed, such as due to a validation failure, the result field 134 may indicate the requested profile state change has failed, as well as a reason for the failure or a reason code that represents the reason for failure. For example, the reason may be a mismatch of the initial profile state specified in the profile transition request 110 to the actual current profile state, or that the profile state change specified in the profile transition request 110 is disallowed. In another example, the reason may be that the request timed out due to the subscription management service 108 being unable to process the profile transition request 110 within a predetermined period of time after receiving the request. In some embodiments, the reason or the reason code may be formatted to appear in a separate reason field rather than in the result field 134. In such embodiments, the reason field may be empty or contain a null value if the corresponding profile state change is successfully completed.

Following the receipt of the profile transition notification 128, the eSIM management platform 104 may determine whether the notification indicates that the profile state change was successful or failed. If the profile state change was successful, the eSIM management platform 104 may further notify the requesting entity that the profile state of eSIM profile 112 is updated. If the profile state change failed due to the request timing out at the subscription management service 108, the eSIM management platform 104 may automatically resend the profile transition request 110 to the subscription management service 108. The eSIM management platform 104 may perform this retry either indefinitely until a successful retry is achieved, or the eSIM management platform 104 may perform the retry for a predetermined number of times if additional timeouts occur before reporting the failure to the requesting entity. However, if the profile state change failed for other reasons, the eSIM management platform may pass the failure notification to the entity of the failure without taking further action.

In some instances, the failure notification may prompt the entity to use the eSIM management platform 104 to query the subscription management service 108 for a current profile of the eSIM profile from the profile state database 126. Subsequently, the entity may send a corrected profile transition request that includes the current profile state as the initial profile state of the eSIM profile 112. Alternatively or concurrently, the corrected profile transition request may include a modified target profile state for the eSIM profile 112 if a disallowed target profile state is a reason for the failure.

In some embodiments, the eSIM management platform 104 may automatically deem that a failure occurred if no profile transition notification 128 is received from the subscription management service 108 within a predetermined amount of time following the transmission of the profile transition request 110 to the service. This lack of notification may mean that the subscription management service 108 never received the profile transition request 110 due to a communication error or another type of error. In some implementations, the eSIM management platform 104 may automatically resend the profile transition request 110 to the subscription management service 108 when such a failure is deemed to have occurred. The eSIM management platform 104 may perform this retry for a predetermined number of times if additional timeouts occur before reporting the failure to the requesting entity. In other implementations, the eSIM management platform 104 may directly report this failure to the requesting entity for the requesting entity to determine a course of action. For example, the entity may ask the eSIM management platform 104 to send another identical profile transition request to the subscription management service 108 after a predetermined amount of time has passed, in which the request includes an identical requested profile state change. Alternatively, the entity may batch the profile state change requested in the profile transition request with other profile state changes for one or more other eSIM profiles and send them to the eSIM management platform 104 for eventual processing by the subscription management service 108.

Figure 2:
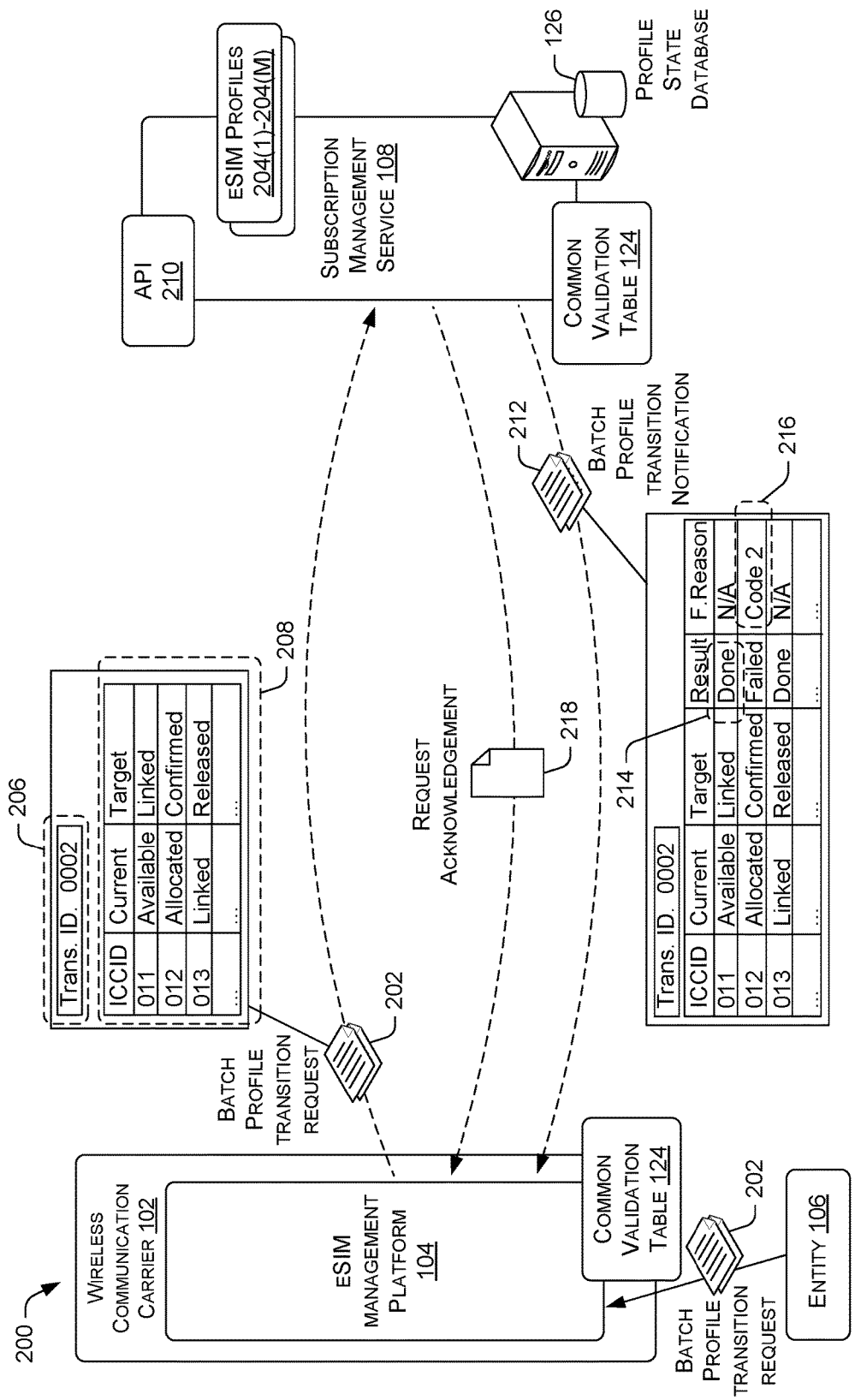
FIG. 2 illustrates a scenario in which the eSIM management platform initiates the subscription management service to perform bulk updates of the profile states of eSIM profiles.

FIG. 2 illustrates a scenario 200 in which the eSIM management platform initiates the subscription management service to perform bulk updates of the profile states of eSIM profiles. In FIG. 2, the wireless communication carrier 102, the eSIM management platform 104, the entity 106, and the subscription management service 108 are as described with respect to the example architecture 100. In operation, the entity 106 may call an API of the eSIM management platform 104 to send a batch profile transition request 202 to the eSIM management platform 104. The batch profile transition request 202 may be requesting profile state changes for multiple eSIM profiles, such as the eSIM profiles 204(1)-204(M). Depending on its corresponding deployment status, each of the eSIM profiles 204(1)-204(M) may be stored in a profile store of the subscription management service 108, or provisioned in an eUICC of a user device. In turn, the eSIM management platform 104 may send the batch profile transition request 202 to the subscription management service 108.

In some embodiments, the batch profile transition request 202 may be in the form of a data file, such as a comma separated value (CSV) file, an Extensible Markup Language (XML) file, or another type of delineated data file. In such embodiments, the data file may contain a transaction identifier 206 that uniquely identifies the batch profile transition request 202. The data file may further contain multiple data entries 208 for the eSIM profiles 204(1)-204(M). Each of the data entries contains an ICCID identifier, an initial state field, and a target state field. The ICCID identifier identifies the corresponding eSIM profile for which the profile state change is requested, the initial state field indicates an eSIM profile state that the request entity has as the up-to-date profile state of the corresponding eSIM profile. The target state field indicates an end profile state to which the corresponding eSIM profile is to transition. The eSIM management platform 104 may use a file transfer mechanism provided by the subscription management service 108 to transfer the batch profile transition request 202 to the service. For example, the file transfer mechanism be a Secure Copy Protocol (SCP) application, a Secure File Transfer Protocol (SFTP) application, a HTTP Secure (HTTPS) file transfer application, and/or so forth.

In other embodiments, the eSIM management platform 104 may call an API 210 of the subscription management service 108 to transfer the batch profile transition request 202. In such embodiments, the batch profile transition request may contain an array of multiple datasets, in which each of the datasets is similar to the dataset described with respect to the profile transition request 110. Accordingly, the API 210 may be a new API that is specifically implemented on the subscription management service 108 to receive batch profile transition requests from the eSIM management platform 104. For example, the API may be a REST API that transfers the batch profile transition request 202 as JSON data.

The eSIM management platform 104 may validate that each profile state change requested in the batch profile transition request 202 is a permissible operation prior to sending the request to the subscription management service 108. The eSIM management platform 104 may use a validation table that is common to the platform and the subscription management service 108, such as the common validation table 124, to perform the validation in the same manner as described in FIG. 1. Accordingly, if all of the profile state changes requested by the batch profile transition request 202 are allowable operations, the eSIM management platform 104 may send the profile transition request 110 to the subscription management service 108. However, if any one of the requested profile state changes is a disallowed operation, the eSIM management platform 104 may send a notification to the requesting entity indicating that the batch profile transition request 202 is not permitted.

Following receipt of the batch profile transition request 202, the subscription management service 108 may verify whether each of the initial profile states of the eSIM profiles 204(1)-204(M) in the profile transition request 110 matches a corresponding current profile state stored in the profile state database 126 of the subscription management service. This verification is performed in the same manner as described in FIG. 1 with respect to the initial profile state 118 and the current profile state of eSIM profile 112. Thus, for each one of the initial profile states that does not match a corresponding current profile state, the subscription management service 108 may refuse to perform the corresponding profile state change specified in the batch profile transition request 202. Instead, the subscription management service 108 may eventually notify the eSIM management platform 104 of the error after processing of the batch is complete.

Alternatively or concurrently, the subscription management service 108 may validate whether each profile state change requested in the batch profile transition request 202 is a permissible operation. Such a validation is performed in the same manner as described in FIG. 1. Accordingly, if the subscription management service 108 determines that a particular profile state change specified in the batch profile transition request 202 is a disallowed operation, the subscription management service 108 may refuse to perform the particular profile state change. Instead, the subscription management service 108 may eventually notify the eSIM management platform 104 of the error after the processing of the batch is complete. However, for each profile state change requested in the batch profile transition request 202 that passes the one or more requisite validations, the subscription management service 108 may change a corresponding profile state as stored in the profile state database 126 from the current profile state to the specified target profile state. In some instances, if the subscription management service 108 determines that a particular profile state change specified in the batch profile transition request 202 is a disallowed operation, the subscription management service 108 may refuse to perform the entire batch profile transition request 202.

The subscription management service 108 may send a batch profile transition notification 212 to the eSIM management platform 104 following a processing of the batch profile transition request 202. In instances in which the batch profile transition request 202 is a data file, the batch profile transition notification 212 may be a modified version of the data file. For example, two additional data fields may be appended to each data entry in the batch profile transition notification 212. The first additional data field (e.g., data field 214) is a result data field that shows the success or failure of the requested profile state change. The second additional data field is a reason data field (e.g., data field 216) that shows one or more reasons for the corresponding failure or one or more reason code that represent the corresponding reasons for failure. For example, the reason may be a mismatch of the initial profile state specified for an eSIM profile in the batch profile transition request 202 to the actual current profile state, and/or that the profile state change specified for the eSIM profile is disallowed. In another example, the reason may be that the request timed out due to the subscription management service 108 being unable to process the entire batch profile transition request 202 within a predetermined period of time after receiving the request. However, if the profile state change is successful for an eSIM profile, the corresponding reason data field may be empty or contain a null value.

A batch profile transition request may pose some additional complications for the subscription management service 108. For example, the batch profile transition request can potentially include profile state updates for tens of thousands of eSIM profiles. The subscription management service 108 may have a finite capacity to handle normal real-time eSIM profile transactions as well as large volume profile state changes. As such, the subscription management service 108 may take up to several hours to process a batch profile transition request. Accordingly, the subscription management service 108 may send a request acknowledgment 218 to the eSIM management platform 104 after receiving the batch profile transition request but before beginning or before entirely processing the request. In this way, the eSIM management platform 104 may be notified right away that the request has been received by the subscription management service 108 and will be processed in due course.

In alternative embodiments, the batch profile transition notification 212 may simply be a message indicating that a data file of transition results is ready for the eSIM management platform 104 to download. For example, the message may include a web link or a directory path to a data storage location of the subscription management service 108 where the data file is located. The data file may be a modified version of the batch profile transition request 202 with the additional result field and reason field for each data entry showing the appropriate information. In response to such notification, the eSIM management platform 104 may navigate to the data storage location and retrieve the data file. For example, the eSIM management platform 104 may use a Secure Copy Protocol (SCP) application, a Secure File Transfer Protocol (SFTP) application, or a HTTP Secure (HTTPS) file transfer application to retrieve the data file from the data storage location. Further, in instances in which the batch profile transition request 202 is an array of datasets sent to the subscription management service 108 via an API, the batch profile transition notification 212 may be an array of response datasets. Each of the response data sets in the array may resemble the dataset described with respect to the profile transition notification 128.

In some embodiments, the eSIM management platform 104 may automatically deem that a failure occurred if no profile transition notification 128 is received from the subscription management service 108 within a predetermined amount of time. The predetermined amount of time may be measured from a time that the profile transition request 110 is transmitted to the subscription management service 108. Alternatively, the predetermined amount of time may be measured from a time that the request acknowledgement 218 is received from the subscription management service 108. In some implementations, the eSIM management platform 104 may automatically resend the batch profile transition request 202 to the subscription management service 108 when the failure is deemed to have occurred. The eSIM management platform 104 may perform this retry indefinitely until successful or it may perform this retry for a predetermined number of times if additional timeouts occur before reporting the failure to the requesting entity.

In other implementations, the eSIM management platform 104 may report this failure to the requesting entity for the requesting entity to determine a course of action. For example, the entity may ask the eSIM management platform 104 to send another identical profile transition request to the subscription management service 108 after a predetermined amount of time has passed, in which the request includes identical requested profile state changes. Alternatively, the entity may split the profile state changes requested in the batch profile transition request 202 into multiple smaller requests and send them to the eSIM management platform 104 for processing by the subscription management service 108.

Example Computing Device Components

Figure 3:
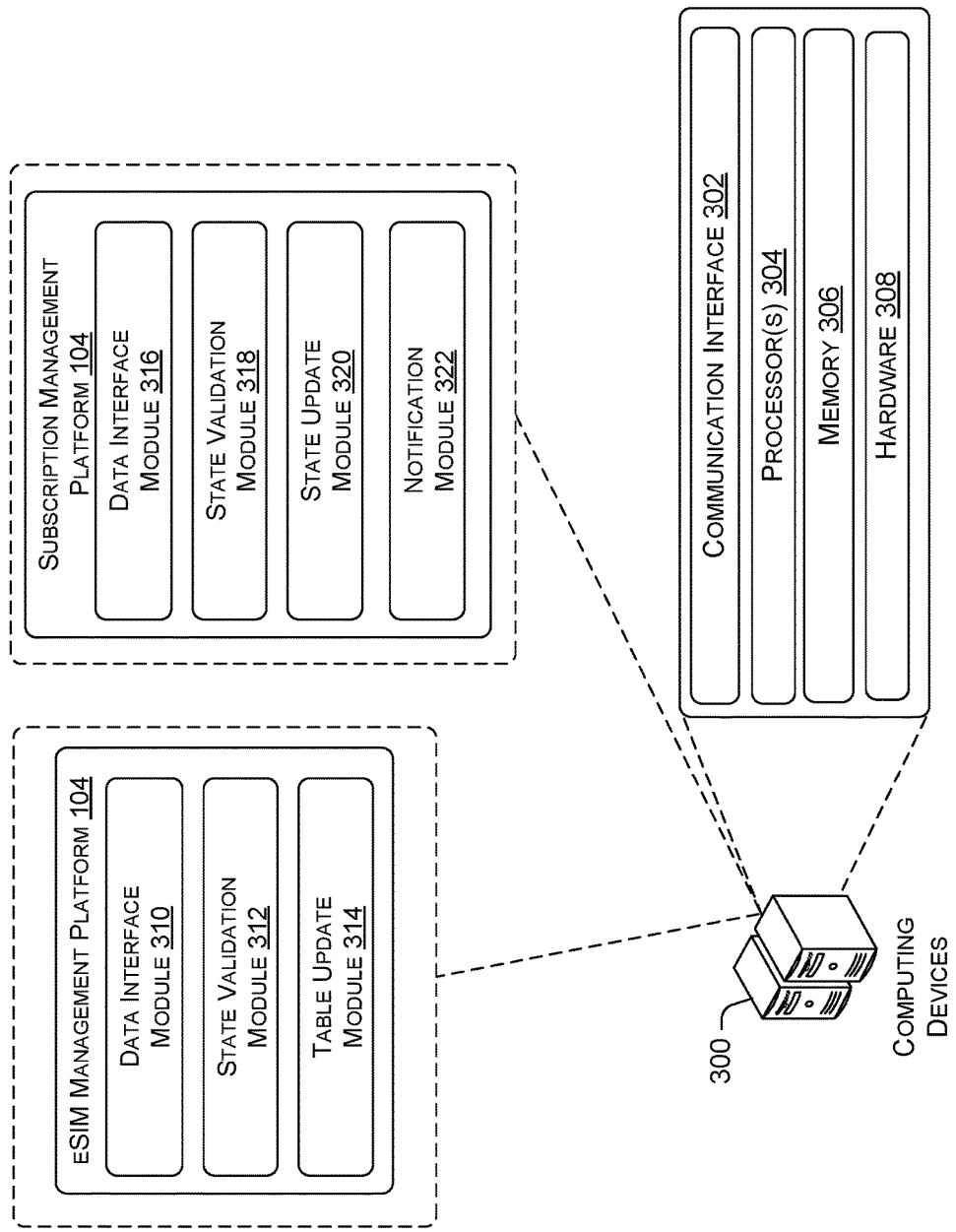
FIG. 3 is a block diagram showing various components of one or more illustrative computing devices of an eSIM management platform that initiates a subscription management service to update profile states of eSIM profiles.

FIG. 3 is a block diagram showing various components of one or more illustrative computing devices of an eSIM management platform that initiates a subscription management service to update profile states of eSIM profiles. The computing devices 300 may include a communication interface 302, one or more processors 304, memory 306, and hardware 308. The communication interface 302 may include wireless and/or wired communication components that enable the computing devices 300 to transmit data to and receive data from other networked devices. The hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In other embodiments, the computing devices 300 or components thereof may be virtual computing devices in the form of virtual machines or software containers that are hosted in a computing cloud.

The computing devices 300 may implement various back-end services and components of the wireless communication carrier 102, such as the eSIM management platform 104. The eSIM management platform 104 may include a data interface module 310, a state validation module 312, and a table update module 314 that facilitate explicitly requesting the subscription management service 108 to perform profile state changes. The modules may include routines, code segments, program instructions, objects, and/or data structures that perform particular tasks or implement particular abstract data types.

The data interface module 310 may provide an API that can be called by an entity to receive profile transition requests from the entity. The data interface module 310 may further call the API 122 or the API 210 of the subscription management service 108 to transfer the profile transition requests to the service. Alternatively, the data interface module 310 may interface with a file transfer mechanism of the subscription management service 108 to send transition requests. Further, the data interface module 310 may receive the profile transition notifications from the subscription management service 108 for transfer to the entities via APIs or the file transfer mechanism. In some instances, the data interface module 310 may automatically resend a transition request to the subscription management service 108 in the event that a processing error occurs at the service.

The state validation module 312 may use a validation table, such as the common validation table 124, to verify that a profile transition request does not contain any disallowed operations. Accordingly, the state validation module 312 may generate the appropriate error indicator if a disallowed operation is found. Otherwise, the state validation module 312 may permit the profile transition request to be sent to the subscription management service 108.

The table update module 314 may provide an interface for a user to input a new validation table or modifications to an existing validation table. In some instances, the interface may be a user interface portal that enables a user to manually input data. In other instances, the interface may be a data upload interface that enables the user to upload a data file that contains the new validation table or modifications to an existing validation table. In turn, the table update module 314 may store the new or modified validation for use by the eSIM management platform 104. Further, the table update module 314 may automatically transfer a duplicate of the validation table to the subscription management service 108 for use by the service. For example, the table update module 314 may transfer the validation using SCP, SFTP, HTTPS, and/or so forth.

The subscription management service 108 may be implemented by the computing devices 300. In alternatively embodiments, the subscription management service 108 may be implemented by equivalent component devices that are controlled by a third-party service provider. The subscription management service 108 may include a data interface module 316, a state validation module 318, a state update module 320, and a notification module 322. The modules may include routines, code segments, program instructions, objects, and/or data structures that perform particular tasks or implement particular abstract data types.

The data interface module 316 may provide APIs that can be called by the eSIM management platform 104 to receive profile transition requests. Further, the data interface module 316 may further include a file transfer mechanism that receives batch profile transition requests that are in the form of data files. In turn, the data interface module 316 may send request acknowledgements and profile transition notifications to the eSIM management platform 104. The data interface module 316 may also receive a new validation table or an updated validation table for storage in a data store of the subscription management service 108. The state validation module 318 may verify that an initial profile state of an eSIM profile included in a request for a profile state change matches a corresponding current state for the eSIM profile as stored in the profile state database 126. Further, the state validation module 318 may use a validation table, such as the common validation table 124, to verify that a profile transition request does not contain any disallowed operations. Accordingly, the state validation module 318 may generate an appropriate error indicator if there is a profile state mismatch or if a disallowed operation is found. The error indicator may further include one or more reasons or reason codes for the failure. Otherwise, the state validation module 318 may permit the state update module 320 to perform the profile state change requested.

The state update module 320 may update the profile state of an eSIM profile as stored in the profile state database 126 if the state validation module has deemed that a profile transition request is allowable. In various embodiments, the state update module 320 may include a profile transition request queue and a scheduler function so that these profile transition requests from the eSIM management platform 104 are processed along with other normal real-time eSIM profile transactions. For example, the state update module 320 may generate an error indication if the module is unable to process the profile transition request 110 or the batch profile transition request 202 in a corresponding predetermined amount of time. In some instances, the state update module 320 may perform a designated number of processing retries of a profile transition request prior to generate the error indication. The notification module 322 may generate response acknowledgements and transition notifications for transmission to the eSIM management platform 104. In instances in which the original request is a batch profile transition request, the generated transition notification may be a standalone report or an appended version of the original request. Each of the transition notifications may include one or more indicators of profile state change success or failure. For requested profile state changes that have failed, the transition notifications that are generated may include one or more reasons or reason codes for the failure.

Example Processes

FIGS. 4-8 present illustrative processes 400-800 for an eSIM management platform to initiate a subscription management service to perform an individual update of a profile state of an eSIM profile, or perform a batch update of multiple profile states of eSIM profiles. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the architecture 100 of FIG. 1.

Figure 4:
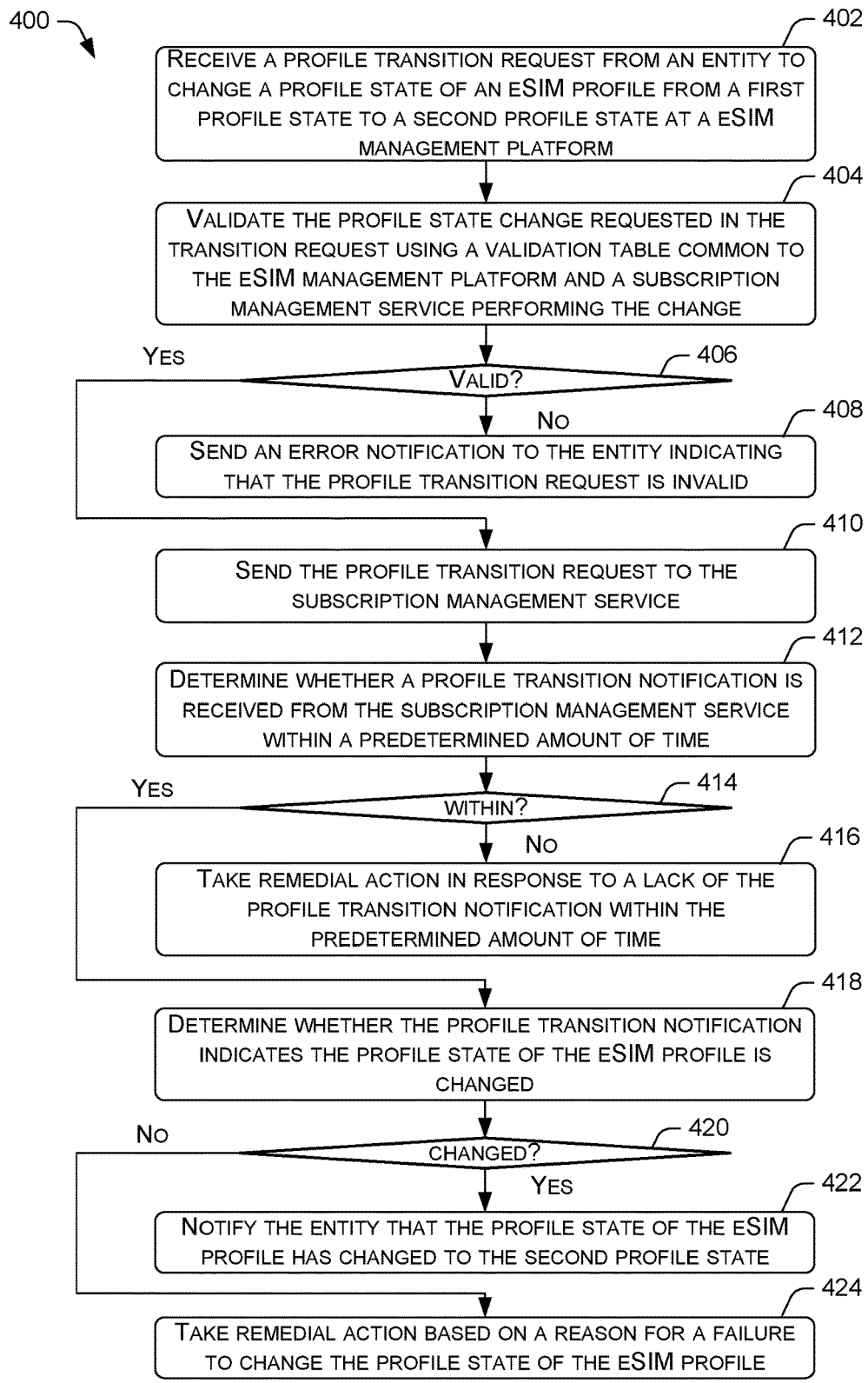
FIG. 4 is a flow diagram of an example process for an eSIM management platform to initiate an individual request to update a profile state of an eSIM profile to the subscription management service.

FIG. 4 is a flow diagram of an example process 400 for an eSIM management platform 104 to initiate an individual request to update a profile state of an eSIM profile to the subscription management service. At block 402, the eSIM management platform 104 may receive a profile transition request from an entity to change a profile state of an eSIM profile from a first profile state to a second profile state. In various embodiments, the entity may call an API of the eSIM management platform 104 to send the profile transition request to the eSIM management platform 104. Depending on whether the eSIM profile has been deployed, the eSIM profile may be stored in a profile store of the subscription management service 108, or provisioned in an eUICC of a user device.

At block 404, the eSIM management platform 104 may validate the profile state change requested in the transition request using a validation table that is common to the eSIM management platform 104 and the subscription management service 108 that is performing the change. Such validation may prevent the intentional or accidental cloning of an eSIM profile via a profile state change. For example, accidentally or intentionally changing the profile state of an eSIM profile that is already installed and enabled on an eUICC of a user device to a profile state of "available" means that the same eSIM profile can then be downloaded to the eUICC of a different user device.

At decision block 406, if the eSIM management platform 104 determines that the profile state change is invalid ("no" at decision block 406), the process 400 may proceed to block 408. At block 408, the eSIM management platform 104 may send an error notification to the entity indicating that the profile transition request is invalid. However, if the eSIM management platform 104 determines that the profile state change is valid ("yes" at decision block 406), the process 400 may proceed to block 410.

At block 410, the eSIM management platform 104 may send the profile transition request to the subscription management service 108. In some instances, the eSIM management platform 104 may call a new API or a modified API of the subscription management service 108 to send the profile transition request to the subscription management service 108. At block 412, the eSIM management platform 104 may determine whether a profile transition notification is received from the subscription management service 108 in a predetermined amount of time.

Accordingly, at decision block 414, if the profile transition notification is not received within the predetermined amount of time ("no" at decision block 414), the process 400 may proceed to block 416. At block 416, the eSIM management platform 104 may take remedial action in response to the lack of the profile transition notification within the predetermined amount of time. In some embodiments, the eSIM management platform 104 may automatically resend the profile transition request to the subscription management service 108 (not shown). The eSIM management platform 104 may perform this retry for a predetermined number of times if additional timeouts occur before reporting the failure to the requesting entity. In other implementations, the eSIM management platform 104 may directly report this failure to the entity for the entity to determine a course of action.

However, if the profile transition notification is received within the predetermined amount of time ("yes" at decision block 414), the process 400 may proceed to block 418. At block 418, the eSIM profile management platform may determine whether the profile transition notification indicates the profile state of the eSIM profile is changed. At decision block 420, if the notification indicates that the profile state is changed ("yes" at decision block 420), the process 400 may proceed to block 422. At block 422, the eSIM management platform 104 may notify the entity that the profile state of the eSIM profile has changed to the second profile state. Such a notification may trigger the entity to request via the eSIM management platform 104 that the subscription management service 108 perform a task with respect to the eSIM profile. For example, such a task may include provisioning an eUICC of a user device with the eSIM profile, delete the eSIM profile from the eUICC of the user device, activate the eSIM profile as stored in the eUICC of the user device for use to obtain communication services from a wireless communication carrier, and/or so forth.

However, if the notification indicates that the profile state is not changed ("no" at decision block 420), the process 400 may proceed to block 424. At block 424, the eSIM management platform 104 may take remedial action based on a reason for a failure to change the profile state of the eSIM profile. For example, if the profile state change failed due to the profile transition request timing out at the subscription management service 108, the eSIM management platform 104 may automatically resend the profile transition request 110 to the subscription management service 108. The eSIM management platform 104 may perform this retry for a predetermined number of times if additional timeouts occur before reporting the failure to the requesting entity. However, if the profile state change failed for other reasons, the eSIM management platform may pass the failure notification to the entity of the failure, so that the entity may send a corrected profile transition request that includes a modified current profile state and/or a modified target profile state.

Figure 5:
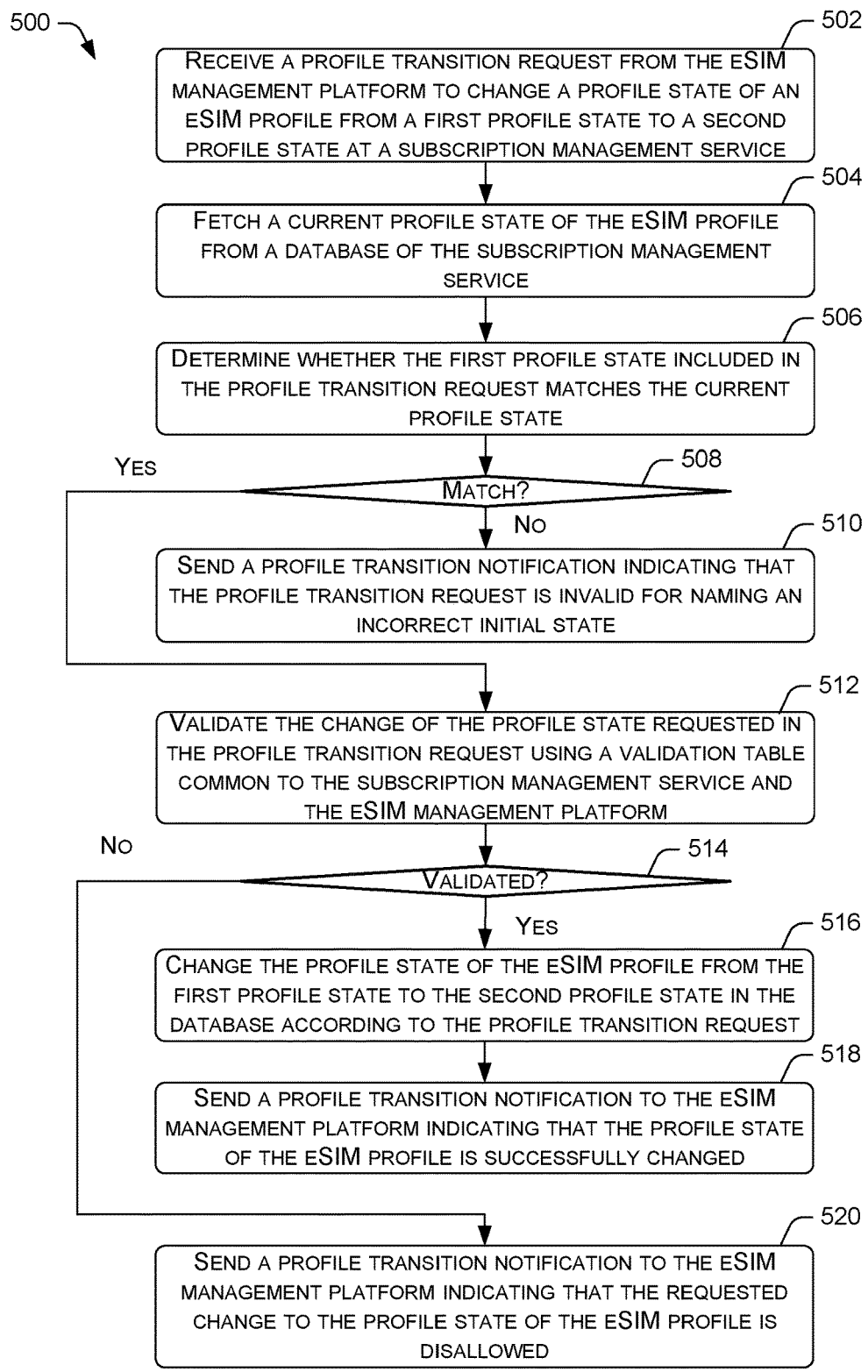
FIG. 5 is a flow diagram of an example process for a subscription management service to perform an individual update of a profile state of an eSIM profile in response to a request from an eSIM management platform.

FIG. 5 is a flow diagram of an example process 500 for a subscription management service 108 to perform an individual update of a profile state of an eSIM profile in response to a request from an eSIM management platform. The process 500 may be performed in conjunction with the process 400 in FIG. 4. At block 502, the subscription management service 108 may receive a profile transition request from the eSIM management platform 104 to change a profile state of an eSIM profile from a first profile state to a second profile state. In various embodiments, the subscription management service 108 may provide a new API or a modified API to enable the eSIM management platform 104 to send the profile transition request to the subscription management service 108.

At block 504, the subscription management service 108 may fetch a current profile state of the eSIM profile from the profile state database 126 of the subscription management service 108. At block 506, the subscription management service 108 may determine whether the first profile state included in the profile transition request matches the current profile state. At decision block 508, if the subscription management service 108 determines that the first profile state does not match the current profile state ("no" at decision block 508), the process 500 may proceed to block 510. At block 510, the subscription management service 108 may send a profile transition notification indicating that the profile transition request is invalid for naming an incorrect initial state. However, if the subscription management service 108 determines that the first profile state does match the current profile state ("yes" at decision block 508), the process 500 may proceed to block 512.

At block 512, the subscription management service 108 may validate the change of the profile state requested in the profile transition request using a validation table common to the subscription management service 108 and the eSIM management platform 104. Such validation may prevent the intentional or accidental cloning of an eSIM profile via a profile state change. For example, accidentally or intentionally changing the profile state of an eSIM profile that is already installed and enabled on an eUICC of a user device to a profile state of "available" means that the same eSIM profile can then be downloaded to the eUICC of a different user device. The subscription management service 108 may perform such a validation regardless of whether the eSIM management platform 104 has already performed the validation as an additional security measure.

At decision block 514, if the subscription management service 108 determines that the requested change of the profile state is validated ("yes" at decision block 514), the process 500 may proceed to block 516. At block 516, the subscription management service 108 may change the profile state of the eSIM profile from the first profile state to the second profile state according to the profile transition request. At block 518, the subscription management service 108 may send a profile transition notification to the eSIM management platform 104 indicating that the profile state of the eSIM profile is successfully changed.

Returning to decision block 514, if the subscription management service 108 determines that the requested change of the profile state is invalid ("no" at decision block 514), the process 500 may proceed to block 520. At block 520, the subscription management service 108 may send a profile transition notification to the eSIM management platform 104 indicating that the requested change to the eSIM profile is disallowed.

Figure 6:
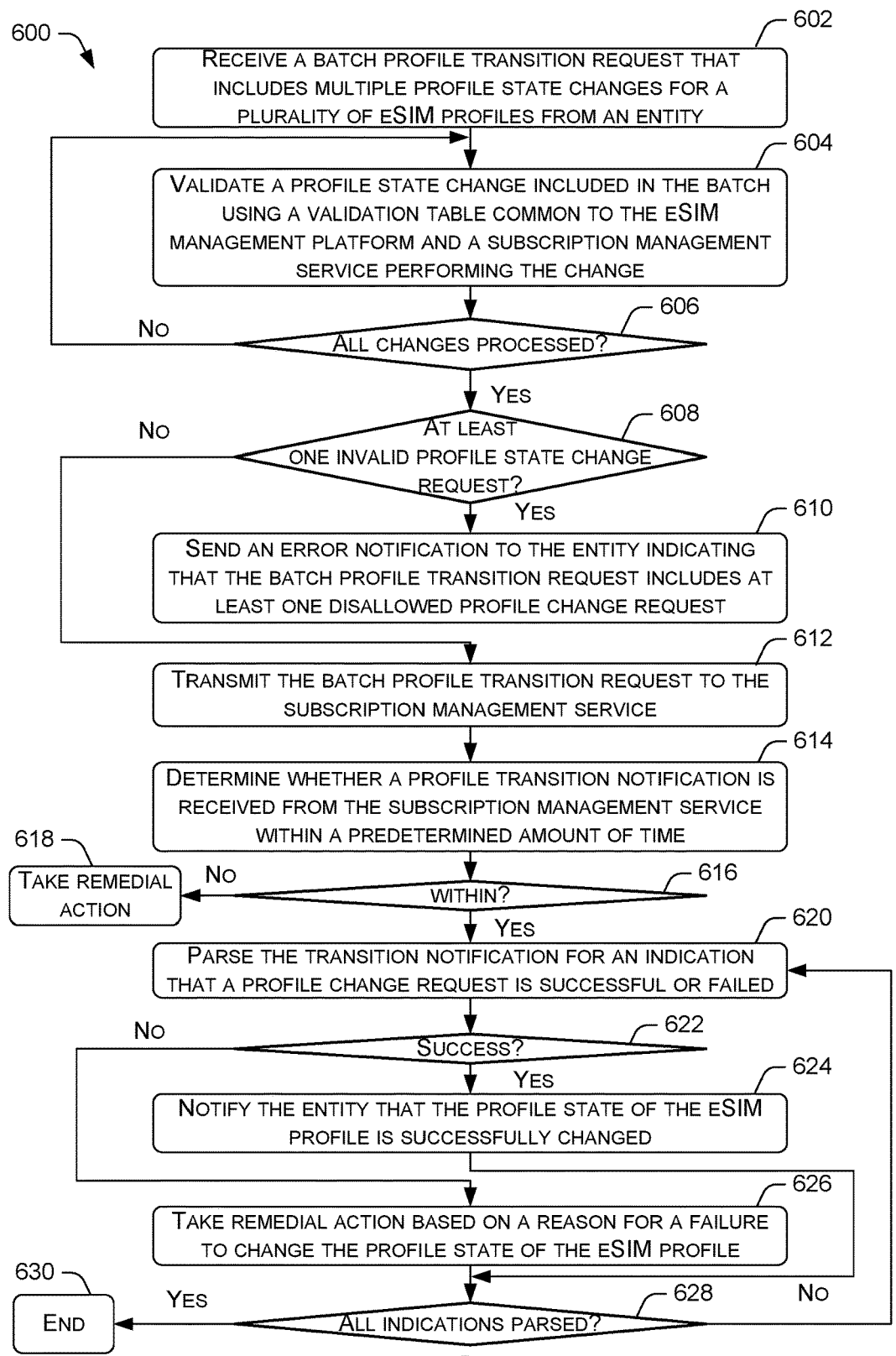
FIG. 6 is a flow diagram of an example process for an eSIM management platform to initiate a batch update of multiple profile states of eSIM profiles by the subscription management service.

FIG. 6 is a flow diagram of an example process 600 for an eSIM management platform 104 to initiate a batch update of multiple profile states of eSIM profiles by the subscription management service. At block 602, the eSIM management platform 104 may receive a batch profile transition request that includes multiple profile state changes for a plurality of eSIM profiles from an entity. In various embodiments, the entity may call an API or use a data transfer mechanism of the eSIM management platform 104 to send the profile transition request to the eSIM management platform 104. Depending on whether an eSIM profile affected by the update has been deployed, the eSIM profile may be stored in a profile store of the subscription management service 108, or provisioned in an eUICC of a user device.

At block 604, the eSIM management platform 104 may validate a requested profile state change included in the batch using a validation table common to the eSIM management platform 104 and the subscription management service 108 that is performing the profile state change. Such validation may prevent the intentional or accidental cloning of an eSIM profile via a profile state change. For example, accidentally or intentionally changing the profile state of an eSIM profile that is already installed and enabled on an eUICC of a user device to a profile state of "available" means that the same eSIM profile can then be downloaded to the eUICC of a different user device.

At decision block 606, the eSIM management platform 104 may determine whether all requested profile state changes in the batch has been processed. Accordingly, if not all of the requested profile state changes have been processed ("no" at decision block 606), the process 600 may loop back to block 604 so that another requested profile state change included in the batch may be validated using the validation table. However, if all of the requested profile state changes included in the batch have been processed ("yes" at decision block 606), the process 600 may proceed to decision block 608.

At decision block 608, the eSIM management platform 104 may determine whether at least one invalid profile state change was detected during the validation. Accordingly, if at least one invalid profile state change was detected ("yes" at decision block 608), the process 600 may proceed to block 610. At block 610, the eSIM management platform 104 may send an error notification to the entity indicating that the batch includes at least one disallowed requested profile state change.

However, if no invalid profile state change was requested in the batch ("no" at decision block 608), the process 600 may proceed to block 612. At block 612, the eSIM management platform 104 may transmit the batch to the subscription management service 108 for processing.

At block 614, the eSIM management platform 104 may determine whether a profile transition notification is received from the subscription management service 108 within a predetermined amount of time. At decision block 616, if the eSIM management platform 104 does not receive the notification within the predetermined amount of time ("no" at decision block 616), the process 600 may proceed to block 618. At block 618, the eSIM management platform 104 may take remedial action in response to a lack of profile transition notification within the predetermined amount of time. In some embodiments, the eSIM management platform 104 may automatically resend the profile transition request to the subscription management service 108. The eSIM management platform 104 may perform this retry for a predetermined number of times if additional timeouts occur before reporting the failure to the requesting entity. In other implementations, the eSIM management platform 104 may directly report this failure to the entity for the entity to determine a course of action.

However, if the eSIM management platform 104 receives the profile transition notification within the predetermined amount of time ("yes" at decision block 616), the process 600 may proceed to block 620. At block 620, the eSIM management platform 104 may parse the transition notification for an indication that a profile change request is successful or failed. At decision block 622, if the indication indicates that the profile change request is successful ("yes" at decision block 622), the process 600 may proceed to block 624. At block 624, the eSIM management platform 104 may notify the entity that the profile state of the eSIM profile is successfully changed. Such a notification may trigger the entity to eventually request via the eSIM management platform 104 that the subscription management service 108 perform a task with respect to the eSIM profile. For example, such a task may include provisioning an eUICC of a user device with the eSIM profile, delete the eSIM profile from the eUICC of the user device, activate the eSIM profile as stored in the eUICC of the user device for use to obtain communication services from a wireless communication carrier, and/or so forth. Subsequently, the process 600 may proceed to decision block 628.

Returning to decision block 622, if the indication indicates that the profile change request failed ("no" at decision block 622), the process 600 may proceed to block 626. At block 626, the eSIM management platform 104 may take remedial action based on a reason for a failure to change the profile state of the eSIM profile. For example, if the profile state change failed due to the request timing out at the subscription management service 108, the eSIM management platform 104 may automatically resend the profile transition request 110 to the subscription management service 108. The eSIM management platform 104 may perform this retry for a predetermined number of times if additional timeouts occur before reporting the failure to the requesting entity. However, if the profile state change failed for other reasons, the eSIM management platform may pass the failure notification to the entity of the failure so that the entity may send another request that includes a modified current profile state and/or a modified target profile state. Subsequently, the process 600 may once again proceed to decision block 628.

At decision block 628, the eSIM management platform 104 may determine whether all indications of success or failure have been parsed from the notification. Accordingly, if not all indications have been parsed ("no" at decision block 628), the process 600 may loop back to block 620 so that another indication of the profile transition notification may be parsed. However, if all the indications have been parsed ("yes" at decision block 628) the process 600 may terminate at block 630. It will be appreciated that while the notification of the requesting entity of the success or failure of each profile state change and/or taking remedial action for each failed profile state change as described in blocks 624 and 626 may be done individually, such actions may also be performed in a batch manner after all indications in the transition notification have been parsed.

Figure 7:
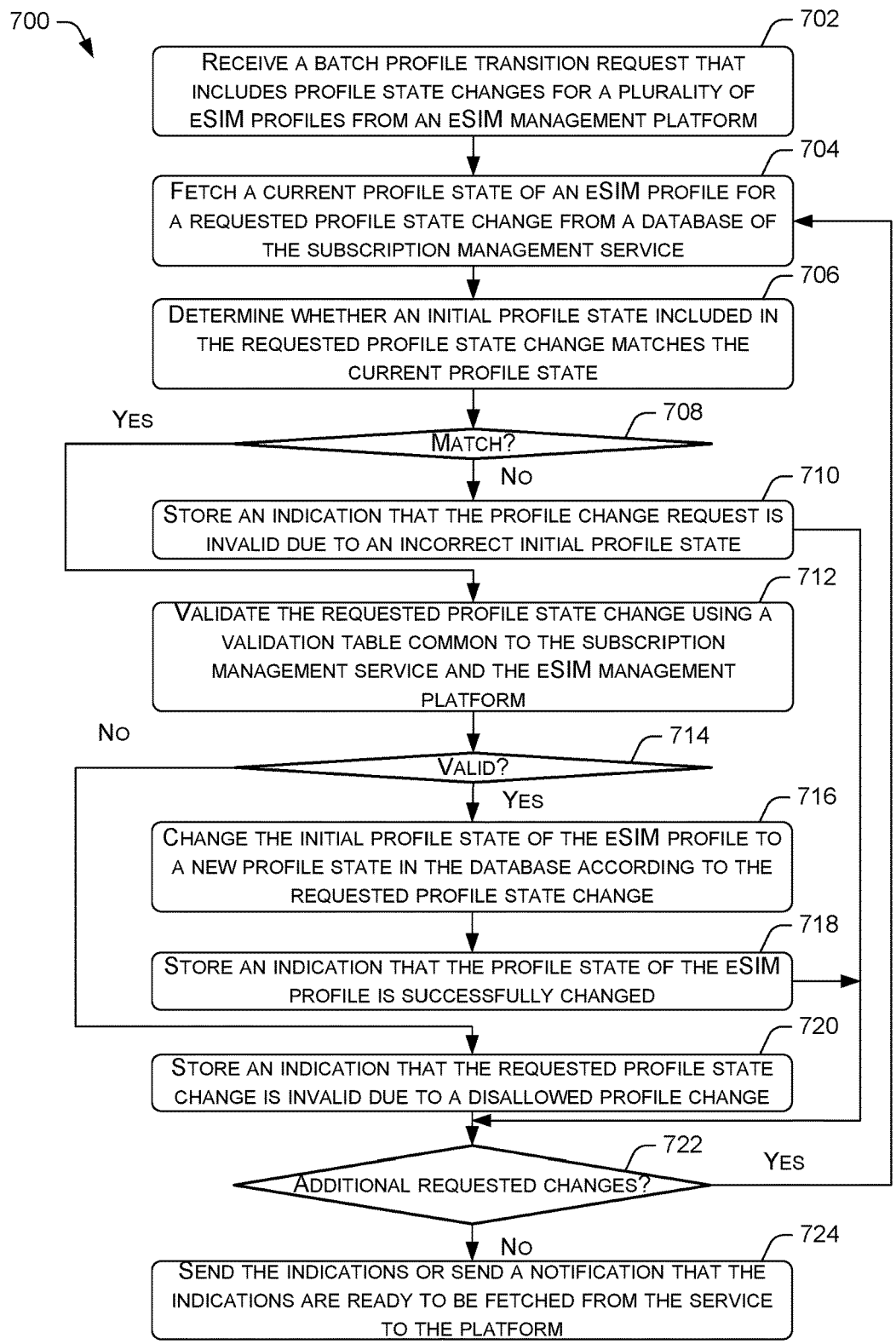
FIG. 7 is a flow diagram of an example process for a subscription management service to perform a batch of profile state updates to multiple eSIM profiles in response to a request from the eSIM management platform.

FIG. 7 is a flow diagram of an example process 700 for a subscription management service 108 to perform a batch of profile state updates to multiple eSIM profiles in response to a request from the eSIM management platform. The process 700 may be performed in conjunction with the process 600 in FIG. 6. At block 702, the subscription management service 108 may receive from the eSIM management platform 108 a batch profile transition request that includes profile state changes for a plurality of eSIM profiles. In various embodiments, the subscription management service 108 may provide a new API or a modified API to enable the eSIM management platform 104 to send the profile transition request to the subscription management service 108.

At block 704, the subscription management service 108 may fetch a current profile state of an eSIM profile for a requested profile state change from the profile state database 126 of the subscription management service. At block 706, the subscription management service 108 may determine whether an initial profile state included in the requested profile state change matches the current profile state. At decision block 708, if the subscription management service 108 determines that the initial profile state does not match the current profile state ("no" at decision block 708), the process 700 may proceed to block 710. At block 710, the subscription may store an indication that the profile change request is invalid due to an incorrect initial profile state. In various embodiments, the indication may be stored in a data buffer of the subscription management service 108 for eventual integration into a profile transition notification. Subsequently, the process 700 may proceed to decision block 722. However, if the subscription management service determines that the initial profile state does match the current profile state ("yes" at decision block 708), the process 700 may proceed to block 712.

At block 712, the subscription management service 108 may validate the profile state change using a validation table that is common to the subscription management service 108 and the eSIM management platform 104. Such validation may prevent the intentional or accidental cloning of an eSIM profile via a profile state change. For example, accidentally or intentionally changing the profile state of an eSIM profile that is already installed and enabled on an eUICC of a user device to a profile state of "available" means that the same eSIM profile can then be downloaded to the eUICC of a different user device.

At decision block 714, if the subscription management service 108 determines that the requested profile state change is validated ("yes" at decision block 714), the process 700 may proceed to block 716. At block 716, the subscription management service 108 may change the initial profile state of the eSIM profile to a new profile state in the profile state database 126 according to the requested profile state change. At block 718, the subscription management service 108 may store an indication that the profile state of the eSIM profile is successfully changed. In various embodiments, the indication may be stored in the data buffer of the subscription management service 108 for eventual integration into a profile transition notification. Subsequently, the process 700 may proceed to decision block 722.

However, if the subscription management service 108 determines that the requested profile state change is invalid ("no" at decision block 714), the process 700 may proceed to block 720. At block 720, the subscription management service 108 may store an indication that the requested profile state change is invalid due to a disallowed profile state change. Subsequently, the process 700 may proceed to decision block 722.

At decision block 722, the subscription management service 108 may determine whether there are additional requested changes in the batch profile transition request. If there are additional requested profile state changes ("yes" at decision block 722), the process 700 may loop back to block 706. However, if there are no additional requested profile state changes ("no" at decision block 722), the process 700 may proceed to block 724. At block 724, the subscription management service 108 may send the indications to the eSIM management platform 104 or send a notification to the platform that the indications are ready to be fetched from the subscription management service 108. For example, the indications may be included in a modified version of the batch transition request or as a data set that includes success or failure of each requested profile change, and if applicable, one or more reasons or reason codes for each failure.

Figure 8:
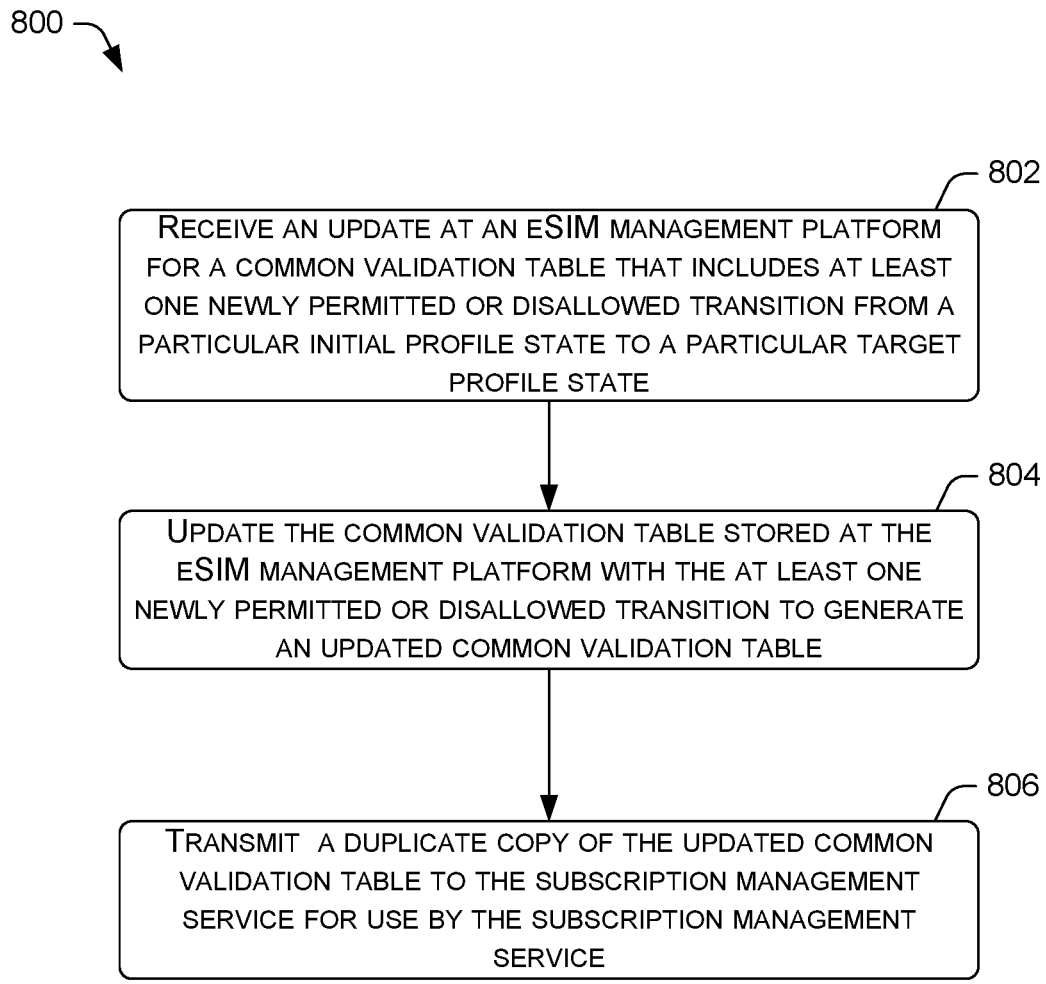
FIG. 8 is a flow diagram of an example process for updating a profile state transition validation table that is common to the eSIM management platform and the subscription management service.

FIG. 8 is a flow diagram of an example process 800 for updating a profile state transition validation table that is common to the eSIM management platform 104 and the subscription management service 108.

At block 802, the eSIM management platform 104 may receive an update to a common validation table, such as the common validation table 124, that includes at least one newly permitted or disallowed transition from a particular initial profile state to a particular target profile state. In some instances, the update may include data manually inputted by a user. In other instances, the update may be in the form of a data file that contains the new validation table or modifications to an existing validation table.

At block 804, the eSIM management platform 104 may update the common validation table stored at the eSIM management platform 104 with the at least one newly permitted or disallowed transition to generate an updated common validation table. In various embodiments, the update may be performed by modify the communication validation table or replacing the common validation table with a new common validation table.

At block 806, the eSIM management platform 104 may transmit a duplicate copy of the updated common validation table to the subscription management service 108 for use by the subscription management service. In various embodiments, the transfer may be performed using SCP, SFTP, HTTPS, and/or so forth.

The embodiments may provide a wireless communication carrier with the ability to directly initiate a subscription management service to perform profile state changes with respect to eSIM profile states that are maintained by the subscription management service. This ability may enable the wireless communication carrier to quickly fix subscriber telecommunication service outage due to incorrect eSIM profile states without resorting to opening trouble tickets with a help desk of the subscription management service. Such trouble tickets may sit in a queue with trouble tickets for other problems awaiting resolution by the help desk of the subscription management service, which may cause unwanted delay. Accordingly, the ability to directly initiate a subscription management service to perform profile state changes may significantly reduce problem resolution time and increase subscriber satisfaction with the wireless communication carrier.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of an embedded Subscriber Identity Module (eSIM) management platform storing computer-executable instructions that upon execution cause one or more processors to perform acts comprising:
receiving a profile transition request from an entity, the profile transition request requesting a profile state change of an eSIM profile from a first profile state to a second profile state;
validating the profile transition request using a validation table of permissible profile state changes that is common to the eSIM management platform and a subscription management service, the validation table of permissible profile state changes including at least one corresponding permissible target profile state for each of one or more initial profile states of the eSIM profile; and
in response to a validation of the profile transition request, sending the profile transition request to the subscription management service to transition the eSIM profile from the first profile state to the second profile state.

2. The one or more non-transitory computer-readable media of claim 1, wherein the acts further comprise sending an error notification to the entity in response to the profile state change from the first profile state to the second profile state being determined to be disallowed based on the validation table.

3. The one or more non-transitory computer-readable media of claim 1, wherein the acts further comprise:
receiving a profile transition notification from the subscription management service that indicates the profile state change for the eSIM profile is successfully performed; and
notifying the entity that the profile state of the eSIM profile has changed from the first profile state to the second profile state.

4. The one or more non-transitory computer-readable media of claim 3, wherein the acts further comprise, following the notifying the entity that the profile state of the eSIM profile has changed:
receiving a request from the entity to provision the eSIM profile to an Embedded Universal Integrated Circuit Card (eUICCs) of a user device, delete the eSIM profile from the eUICC of the user device, or activate the eSIM profile as stored in the eUICC of the user device to obtain communication services; and
sending the request to the subscription management service for implementation with respect to the eSIM profile.

5. The one or more non-transitory computer-readable media of claim 1, wherein the acts further comprise:
receiving a profile transition notification from the subscription management service indicating that the profile state change in the profile transition request for the eSIM profile has failed;
resending the profile state change in another profile transition request to the subscription management service in response to determining that a reason for failure is the profile transition request timed out at the subscription management service; and
notifying the entity of the failure in response to determining that the reason for failure is that the second profile state is not a permissible transition from the first profile state or that the first profile state does not match a current profile state stored in a profile state database of the subscription management service.

6. The one or more non-transitory computer-readable media of claim 5, wherein the acts further comprise:
receiving an additional profile transition request that includes a corrected profile state change with a modified first profile state or a modified second profile state following the notifying the entity of the failure; and
sending the additional profile transition request to the subscription management service to implement the corrected profile state change to the profile state of the eSIM profile.

7. The one or more non-transitory computer-readable media of claim 1, wherein the acts further comprise:
determining that a failure of the profile state change occurred in response to a lack of a profile transition notification from the subscription management service in a predetermined amount of time from the sending of the profile transition request to the subscription management service; and
resending the profile state change in an additional profile transition request or notifying the entity of the failure following the determining that the failure of the profile state change occurred.

8. The one or more non-transitory computer-readable media of claim 7, wherein the acts further comprise receiving another profile transition request that includes the profile state change from the entity following the notifying the entity of the failure.

9. The one or more non-transitory computer-readable media of claim 7, wherein the subscription management service uses the validation table to perform a validation that the profile state change from the first profile state to the second profile state is permissible prior to changing the profile state of the eSIM profile to the second profile state.

10. The one or more non-transitory computer-readable media of claim 9, wherein the validation of the profile state change by at least one of the eSIM management platform or the subscription management service using the validation table prevents cloning of the eSIM profile via the profile state change.

11. The one or more non-transitory computer-readable media of claim 1, wherein the entity is a wireless communication carrier, a third-party partner of the wireless communication carrier, a network aggregator, or a hub.

12. The one or more non-transitory computer-readable media of claim 1, wherein the eSIM profile is a machine-to-machine (M2M) eSIM profile or a consumer eSIM profile for a consumer device.

13. The one or more non-transitory computer-readable media of claim 1, wherein the subscription management service is provided by one or more subscription managers that execute on one or more computing devices, and wherein the sending includes calling an application program interface (API) of the subscription management service to send the profile transition request to the subscription management service.

14. The one or more non-transitory computer-readable media of claim 1, wherein the profile transition request is a batch profile transition request that includes one or more additional profile state changes for one or more corresponding additional eSIM profile in addition to the profile state change for the eSIM profile.

15. The one or more non-transitory computer-readable media of claim 14, wherein the sending includes sending the batch profile transition request as a data file to the subscription management service via a file transfer mechanism provided by the subscription management service.

16. A subscription management service, comprising:
one or more processors; and
memory including a plurality of computer-executable components that are executable by the one or more processors to perform a plurality of actions, the plurality of actions comprising:
receiving a profile transition request that includes one or more requested profile state changes for one or more corresponding embedded Subscriber Identity Module (eSIM) profiles from an eSIM management platform;
determining whether an initial profile state for an eSIM profile as included in a requested profile state change matches a current profile state of the eSIM profile stored in a profile state database;
in response to the initial profile state matching a current profile state, validating the requested profile state change included in the profile transition request using a validation table of permissible profile state changes, the validation table of permissible profile state changes including at least one corresponding permissible target profile state for each of one or more initial profile states of the eSIM profile; and
in response to a mismatch between the initial profile state and the current profile state, sending a profile change failure indication to the eSIM management platform indicating that the requested profile state change is invalid due to an incorrect initial state.

17. The subscription management service of claim 16, wherein the plurality of actions further comprise:
changing a profile state of the eSIM profile from the initial profile state to a target profile state as included in the requested profile state change and sending a profile change success indication to the eSIM management platform in response to the requested profile state change being determined as permissible based on the validation table; and
sending an additional profile change failure indication to the eSIM management platform indicating that the requested profile state change is invalid in response to the requested profile state change being determined as disallowed based on the validation table, wherein the validation table is a duplicate copy of a corresponding validation table that is used by the eSIM management platform to determine whether the requested profile state change is permissible.

18. The subscription management service of claim 17, wherein the profile transition request is a batch profile transition request that includes entries for one or more additional requested profile state changes for one or more corresponding additional eSIM profile and the requested profile state change for the eSIM profile.

19. The subscription management service of claim 18, wherein the sending a success indication or a failure indication includes appending the success indication or the failure indication in an entry for a corresponding eSIM profile in the batch profile transition request to generate a batch profile transition notification, and sending the batch profile transition notification to the eSIM management platform.

20. A computer-implemented method, comprising:
receiving a profile transition request from a wireless communication carrier, the profile transition request requesting a profile state change of an embedded Subscriber Identity Module (eSIM) profile from a first profile state to a second profile state;
validating the profile transition request using a validation table of permissible profile state changes that is common to an eSIM management platform and a subscription management service, the validation table of permissible profile state changes including at least one corresponding permissible target profile state for each of one or more initial profile states of the eSIM profile;
in response to a validation of the profile transition request, sending the profile transition request to the subscription management service to transition the eSIM profile from the first profile state to the second profile state; and
in response to the profile state change from the first profile state to the second profile state being determined to be disallowed based on the validation table, sending an error notification to the wireless communication carrier.

* * * * *